US012582579B2

(12) United States Patent
O'Rourke

(10) Patent No.: US 12,582,579 B2
(45) Date of Patent: Mar. 24, 2026

(54) PREMATURE INFANT PACIFIER

(71) Applicant: Barbara O'Rourke, Ames, IA (US)

(72) Inventor: Barbara O'Rourke, Ames, IA (US)

( * ) Notice: Subject to any disclaimer, the term of this patent is extended or adjusted under 35 U.S.C. 154(b) by 902 days.

(21) Appl. No.: 16/589,992

(22) Filed: Oct. 1, 2019

(65) Prior Publication Data

US 2020/0100990 A1 Apr. 2, 2020

Related U.S. Application Data

(62) Division of application No. 14/336,541, filed on Jul. 21, 2014, now abandoned.

(51) Int. Cl.
*A61J 11/00* (2006.01)
*A61J 17/00* (2006.01)

(52) U.S. Cl.
CPC ........... *A61J 11/0005* (2013.01); *A61J 17/00* (2013.01)

(58) Field of Classification Search
CPC .............................. A61J 11/0005; A61J 17/00
See application file for complete search history.

(56) References Cited

U.S. PATENT DOCUMENTS

| | | | |
|---|---|---|---|
| 1,768,780 | A | 7/1930 | Novak |
| 2,612,165 | A | 9/1952 | Szuderski |
| 2,665,693 | A | 1/1954 | Pecora |
| 2,824,561 | A | 2/1958 | Mueller |
| 3,426,755 | A | 2/1969 | Clegg |
| 3,661,288 | A | 5/1972 | Noll |
| 4,153,170 | A | 5/1979 | Aquarian |
| 5,178,291 | A | 1/1993 | Piercey |
| 5,395,392 | A | 3/1995 | Suhonen |
| 5,578,004 | A | 11/1996 | Liang |
| 5,843,030 | A | 12/1998 | Van Der Merwe |
| 6,126,678 | A | 10/2000 | Aaltonen et al. |
| 6,197,044 | B1 | 3/2001 | Clayton |
| 6,270,519 | B1 | 8/2001 | Botts |
| 6,454,788 | B1 | 9/2002 | Ashton |
| D655,015 | S | 2/2012 | Castro Barreras et al. |
| 8,945,182 | B2 | 2/2015 | Oates, II et al. |

(Continued)

OTHER PUBLICATIONS

James Njiru and Evelyn Matiri, Maternal, Infant and Young Child Nutrition: National Operational Guidelines for Health Workers, 2013, Ministry of Health, Republic of Kenya (Year: 2013).*

(Continued)

*Primary Examiner* — Tri M Mai
(74) *Attorney, Agent, or Firm* — McKee, Voorhees & Sease, PLC

(57) ABSTRACT

The apparatus and process described, allows the premature infant to continue the enjoyable in utero experience of sucking and swallowing that is halted upon birth. In particular the infant is afforded the opportunity to practice tasting, sucking, and swallowing on an individualized basis. This oral enjoyment and practice allow for positive association with feedings and provides a sensory-motor experience that may lead to earlier suck, swallow, breathe (SSB) synchrony. The process engages the esophagus and cardiac sphincter to function while the infant is still being fed through the feeding rube. Ultimately, the apparatus and process may also result in earlier weaning from feeding tubes, the reduction of feeding difficulties, and earlier discharge home.

19 Claims, 1 Drawing Sheet

(56) References Cited

U.S. PATENT DOCUMENTS

| | | | |
|---|---|---|---|
| 2004/0040556 | A1 | 3/2004 | Fillyaw |
| 2007/0203475 | A1 | 8/2007 | Fischer et al. |
| 2009/0182308 | A1 | 7/2009 | Hagbi |

OTHER PUBLICATIONS

University of Michigan, https://www.med.umich.edu/1libr/pa/UMHomeGavageFeed.pdf, https://www.med.umich.edu/1libr/pa/UMHomeGavageFeed.pdf (Year: 2004).*

Google search, "gavage feeding with bottle" (Year: 2022).*

Mr. Sinai hospital, Feeding and Nutrition for Your Baby, https://www.mountsinai.on.ca/care/nicu/Documents/PDF/Feeding_Nutrition.pdf (Year: 2004).* https://www.translatorscafe.com/unit-converter/en-US/volume/24-23/drop-cc/, calculation of one drop in cc (Year: 2022).* http://health.usnews.com/health-news/news/articles/2012/06/08/us-in-top-10-for-premature-births, "U.S. in Top 10 for Premature Births", 2 pages, Jun. 8, 2012.

The American College of Obstetricians and Gynecologists, "Early Preterm Birth", Frequently Asked Questions—FAQ173—Pregnancy, 2 pages, Aug. 2011.

Matthews et al., "Infant Mortality Statistics From the 2007 Period Linked Birth/Infant Death Data Set", National Vital Statistics Report, U.S. Department of Health and Human Services, 31 pages, Jun. 29, 2011.

http://www.kcl.ac.uk/iop/news/records/2012/June/Premature-birth-linked-to-increased-risk-of-mental-health-problems..aspx, "Premature Birth and Mental Health", 1 page, Jul. 6, 2012.

http://www.stanfordchildrens.org/en/topic/default?id=newborn-reflexes-90-P02630, "Newborn-Reflexes", 1 page, Jun. 7, 2013.

Jones et al., "How to achieve successful preterm breastfeeding", Infant, vol. 1, Issue 4, pp. 111-115, 2005.

Lau et al., "Quantitative Evaluation of Infant's Nonnutritive and Nutritive Sucking", Dysphagia, vol. 16, pp. 58-67, Jan. 2001.

Da Costa, Saakje, "Development of Sucking Patterns in Preterm Infants", 53 pages, Apr. 28, 1952.

http://www.telegraph.co.uk/health/healthnews/9303656/Premature-babies-twice-as-prone-to-mental-disorders.html, The Telegraph, "Premature Babies Twice as Prone to Mental Disorders", 2 pages, Jun. 4, 2012.

* cited by examiner

PREMATURE INFANT PACIFIER

CROSS REFERENCE TO RELATED APPLICATIONS

This is a Divisional Application of U.S. Ser. No. 14/336,541, filed Jul. 21, 2014, which is herein incorporated by reference in its entirety.

FIELD OF THE INVENTION

The present invention relates to the feeding of premature infants, the assisted development and/or coordination of the suck, swallow, breathe (SSB) synchrony, and the resolution of feeding difficulties commonly seen in these infants.

BACKGROUND OF THE INVENTION

A premature birth, also called a preterm birth, is defined as birth within the first 37 weeks of gestation. According to the Division of Reproductive Health, National Center for Chronic Disease Prevention and Health Promotion, one out of every nine infants in the United States will be born prematurely of the approximate 500,000 infants delivered each year. The significance being that these premature infants cost the U.S. health care system more than $26 billion each year.

Statistically, in the United States, the majority of babies born prematurely at thirty-five or less weeks of gestation will be admitted to a Neonatal Intensive Care Unit (NICU). The immaturity of the premature infant in all aspects makes him especially vulnerable.

Preterm babies accounted for 35% of the infant deaths in 2008. The American College of Obstetricians and Gynecologists has indicated that premature babies are also at a much higher risk of many serious long-term complications. These complications include:

Respiratory distress syndrome (RDS)
Intracranial bleeding
Infection
Gastrointestinal disorders, including poor feeding
Temperature control
Vision and hearing problems
Neurological disabilities including cerebral palsy
Developmental delays Feeding premature infants often is a challenge for both medical staff and parents. The developmental process of feeding starts in utero, as the fetus begins to suck at approximately fifteen to sixteen weeks of gestation. Swallowing is also developing around the same time at the age of fourteen to seventeen weeks. Swallowing is a complicated process involving twenty-six muscles and six major nerves all working together in a coordinated, timely fashion. The fetus may swallow up to 15 ounces of amniotic fluid a day.

The coordination to suck, swallow, and breathe ("SSB") while bottling or breastfeeding is an important and necessary milestone for the infant to feed successfully and safely. The SSB synchrony begins to develop at approximately thirty-one to thirty-three weeks of gestation, and only matures at approximately thirty-seven to thirty-eight weeks. These fundamental coordinated skills are significantly more difficult for the premature infant.

The NICU attempts to replicate the in utero experience for premature infants, in many ways, by giving them boundaries and dark quiet surroundings, but the practice and enjoyment of swallowing the amniotic fluid is halted. Once the premature infant is born, the functions of these body parts are temporarily put on hold until the infant is medically capable and developmentally mature enough to coordinate his (SSB).

Initially, a feeding tube will be inserted to start the process of feeding. Milk is given through the feeding tube, bypassing the mouth. At the same time the infant is only allowed to suck on a non-nutritive pacifier.

During this early phase in the feeding process, the esophagus and cardiac sphincter of the stomach are basically inactive since only saliva is being swallowed by the infant. In addition, feeding tubes remain in place for weeks, thus resulting in the cardiac sphincter remaining partially open for prolonged periods of time. The use of feedings tubes has been shown to double the likelihood of esophageal reflux in the premature infant.

The premature infant also has a premature brain. Nerve pathways are being wired in response to every experience. Medical protocol will often require the premature infant to undergo obtrusive oral procedures. These procedures may include intubation, suctioning, placement of feeding tubes, and even oral cares is somewhat obtrusive. The infant may begin to associate that anything done orally as unpleasant. It has been shown, that repetitive oral experiences, whether good or bad, are establishing neural mapping and feeding associations. If these associations are negative, it may affect the infant's ability and desire to eat both in the NICU and after discharge from the hospital.

There exists an added concern. Research recently completed by the Institute of Psychiatry at King's College London, indicated "a very strong link" exists between premature birth and mental health disorders. The results are consistent with a 1999 study, published in the American Medical Association's Archives of General Psychiatry. In sum, this research suggests that subtle alterations in the brain development of those born prematurely may play an important role in mental health later in life.

DETAILED DESCRIPTION

Figure 1:
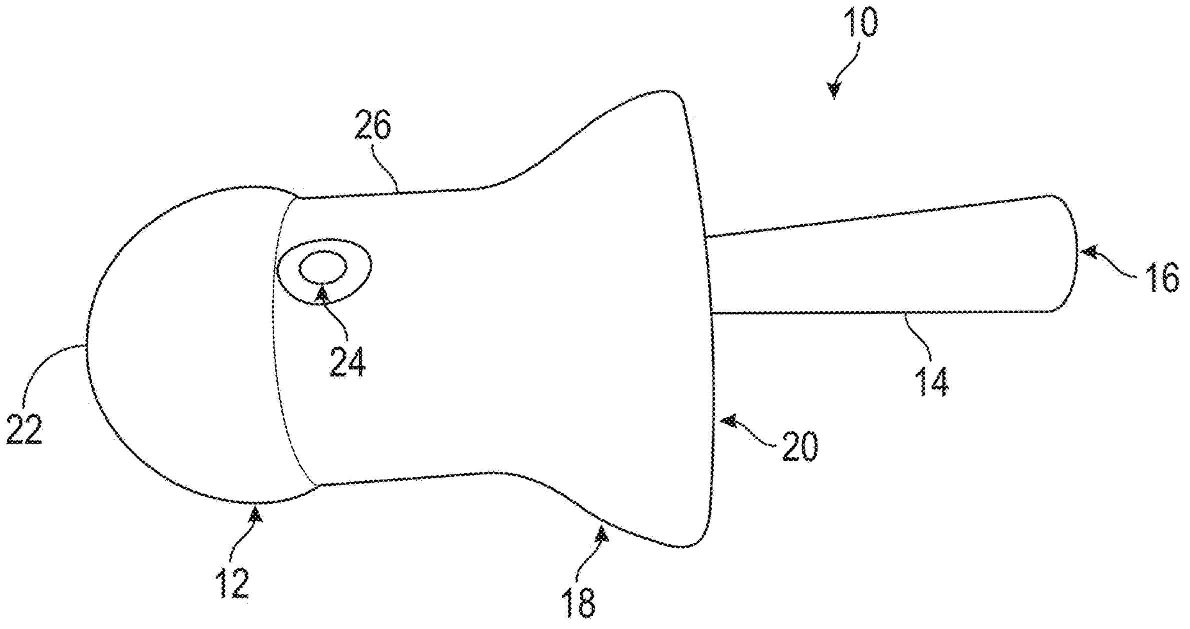
FIG. 1 is one embodiment of the invention providing a top view showing a feeding nipple with a channel created therein for the purpose of providing a liquid to the premature infant, said channel emerging from the side of the nipple.
Figure 2:
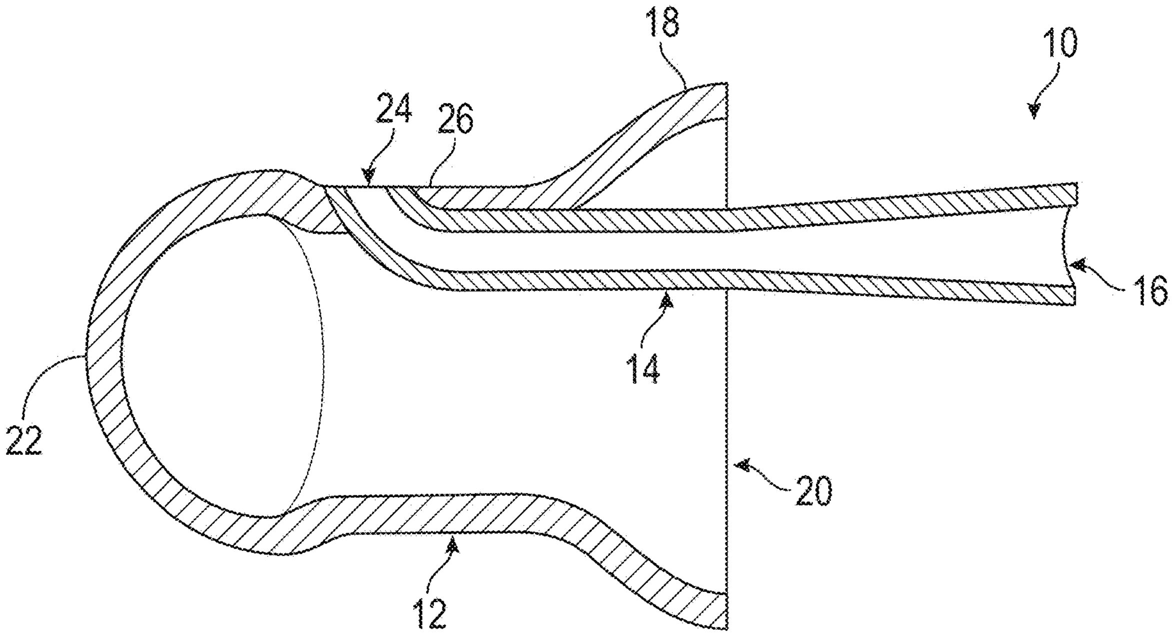
FIG. 2 is one embodiment of the invention providing a cross-sectional view of the feeding nipple further showing the channel created therein for the purpose of providing milk to a premature baby.

The goal of this invention, in all embodiments, is to allow the premature infant to continue the developmental, enjoyable in utero experience of sucking and swallowing that was in process at the time of the infant's premature birth To accomplish this goal, a process and feeding apparatus 10 have been developed that provides the premature infant with the oral pleasure of sucking and swallowing, at the same time giving the infant the opportunity to practice the synchrony of SSB. This process allows the infant to enjoy feedings rather than becoming overwhelmed by allowing the caregiver to control the timing and the amount of milk given orally. Thus, the infant will associate positive neural connections to feedings. In addition, the process also allows the esophagus and cardiac sphincter to actively function while feedings are still being given through the feeding tube.

Historically, premature infants are fed through a feeding tube until developmentally they are mature enough to coordinate their SSB. In transitioning to oral feedings, the infant, who up to this point has not had any milk orally, now pulls a bolus of milk into his mouth. This bolus is often overwhelming to the infant. The infant does not know what to do. In response, the infant may stop breathing, drop his heartrate, and drop his oxygen levels. If this type of experience continues or the infant is pushed to eat the infant may shutdown and stop feeding altogether.

It takes time for the infant to "learn" how to suck, manage the bolus, swallow and breathe. While the infant is "learning" he is also struggling with many negative attempts to feed. The present invention seeks to allow the infant to experience small boluses of milk given in a controlled manner, individual to each infant's response. The infant gradually "learns" how to handle the bolus while enjoying and benefitting from the oral experience of sucking and swallowing.

One embodiment of the invention utilizes a small, specialized pacifier apparatus 10. A pacifier normally has three distinct components-a handle for the caregiver to hold onto the pacifier, a guard which is customarily a plate that rests on the lips of the baby, and a nipple which resides within the mouth of the baby. The invention provides for a pacifier 10 with the nipple 12 sized for the infant's mouth. Further, there are one or more openings, preferably in the form of a channel 14 having an opening 16 in an exterior of the guard 18 and passing from the exterior of the guard to the nipple.

In an embodiment, the channel 14 carrying the milk to the infant emerges from the front bulbous portion 22 of the nipple 12.

In a further embodiment, the channel 14 carrying the milk to the infant emerges from an opening 24 in the side wall 26 of the nipple 12. This allows for the milk to more easily enter the mouth of the infant while suckling, thereby reducing the effort and energy that may otherwise be required by the infant to intake the milk.

In yet another embodiment of the invention, the intake 16 of the channel 14 is preferably flared so as to facilitate the entry of the needle or other means of deposit of the milk into the channel 14. As a non-limiting example, the flared intake 16 of the channel 14 may be in the form of a luer taper or slip fit adapted for use with an oral syringe. Further, preferably, the intake 16 of the channel 14 is constructed of a material that is resistive to penetration or scratching by a needle or other sharp instrument so as to eliminate sites for bacteria development while the invention is in use.

In yet a further preferred embodiment of the invention, the flared intake opening 16 of the channel 14 located in the guard 18, constructed with a hardened material such as metal, ceramic or hardened plastic, is combined with the channel discharge opening 24 located in the side 26 of the nipple 12.

Milk, more preferably mother's breast milk, is given through a channel 14 of the apparatus 10 in a controlled manner, by use of a syringe or other controlled dispensing means. Initially the very premature infant may only be given one or two drops of milk through the apparatus. As the infant sucks, the caregiver responds by giving additional drops of milk as tolerated by the baby. The process is stopped if the infant ceases to suck or responds with a drop-in heart rate, oxygenation, or stops breathing. There are no forced feeding attempts. The focus and goal of these experiences is safety and enjoyment of the infant.

When the infant begins to be fed through the feeding tube, the specialized pacifier 10 will be offered to the infant to start the enjoyable association of tasting, sucking, and swallowing while being fed. As the infant becomes more experienced and mature, he begins to suck longer, and the volume of the milk given orally through the apparatus 10 may be increased. The infant gradually begins to coordinate his SSB during feeding without becoming stressed or tired. When the infant stops sucking, the process is stopped, and the balance of the feeding is given through the feeding tube. This enjoyable oral experience thus promotes the positive neural connection of being satisfied to feeding.

An important additional benefit is that the process requires the caregiver to become more involved and spend time with the infant as they actively engage and respond to the infant sucking and swallowing. This bonding activity between infant and caregiver may have long term significance to the wiring of neural connections related to nurturing and socialization that are also being developed by the premature brain.

In experimentation, it has been found that when using the specialized pacifier 10 and, following the process as stated, the premature baby's heart rate, respiratory rate, and oxygen levels remain stable. The infant is calm and sucks eagerly. Additionally, it has been hypothesized that use of this invention may provide a sensory-motor experience that leads to earlier SSB coordination. This skill allows the infant to enjoy his feeding and make positive developmental strides both physically and neurologically. Ultimately the infant may be able to safely nurse and bottle sooner with earlier discharge home.

The embodiments, variations, and figures described above are provided as an indication of the utility and versatility of the present invention. Other embodiments that do not provide or otherwise utilize all of the features, processes and advantages set forth herein may also be utilized, without departing from the spirit and scope of the present invention. Such modifications and variations are considered to be within the scope of the principles of the invention as defined by the claims set forth below.

The invention claimed is:

1. A method of developing coordination of sucking, swallowing and breathing in a premature baby, allowing the baby to be fed through a feeding tube, comprising:

at a neonatal intensive care unit, providing food through the feeding tube while simultaneously placing a hollow nipple of a pacifier in the premature baby's mouth, the nipple having a closed bulbous forward end with an enlarged diameter, a rear end with an enlarged diameter, and a middle sidewall between the enlarged diameters of the forward and rearward ends, the middle sidewall having a reduced diameter smaller than the enlarged diameters, and having a conduit extending from the rear end to the sidewall with a rear inlet and a outlet though the sidewall;

introducing milk with a syringe into the conduit through the rear inlet;

discharging the milk as droplets in a controlled manner through the outlet for entrance into the premature baby's mouth behind the bulbous front end of the nipple;

whereby the premature baby is simultaneously fed through the feeding tube while providing milk through the nipple without interference with one another;

whereby the premature baby develops coordinated sucking, swallowing and breathing while associating the milk with food.

2. The method of claim 1 wherein the milk is initially limited to a few droplets and then increased over time.

3. The method of claim 1 wherein the pacifier is removed after the baby stops sucking while feeding continues through the feeding tube.

4. The method of claim 1 wherein the conduit extends inside the nipple.

5. The method of claim 1 wherein the milk is introduced into the conduit while the baby is sucking on the pacifier.

6. A method of allowing the premature baby to continue the in-utero experience and development of sucking and swallowing, comprising:

while in a NICU setting, introducing milk into the premature baby's mouth though a single hole in a sidewall of a pacifier having a rear guard and a front bulb, and the hole being behind the bulb; and feeding the premature baby through a feeding tube separate from the pacifier while the baby receives the milk from the pacifier, such that the feeding tube and the pacifier provide dual paths for the baby to receive nutrition;

whereby the developing premature baby while practicing sucking and swallowing is also learning to coordinate their breathing while being fed, prior to being discharged to home.

7. The method of claim 6 wherein the milk emerges from the side of the pacifier into a side of the baby's mouth away from the back of the throat.

8. The method of claim 6 further comprising supplying the milk to the pacifier by a syringe.

9. The method of claim 6 wherein the milk passes through a conduit inside the pacifier leading to the single hole in the sidewall of the pacifier.

10. A method of developing neural mapping oral feeding enjoyment in a premature baby who does not yet orally feed, comprising:

at a NICU medical site, combining gavage feeding through a first feeding tube while simultaneously giving milk orally through a second tube in a pacifier, the first and second tubes being separate from one another; and discharging the milk droplets into the premature baby's mouth through a single opening in a sidewall of the pacifier between a guard on a rear end of the pacifier and a forward tip of the pacifier;

whereby prior to discharging the premature baby from the NICU medical site to their home, the premature baby develops oral feeding skills.

11. The method of claim 10 further comprising introducing the milk into the pacifier with a syringe.

12. The method of claim 11 wherein the milk flow through an internal conduit in the pacifier to the single opening.

13. The method of claim 10 wherein the milk is discharged as droplets from the pacifier.

14. The method of claim 13 wherein the milk droplets are initially limited in volume and increased over time.

15. The method of claim 10 further comprising stopping the milk droplets through the pacifier when the baby stops sucking while continuing the gavage feeding through the feeding tube.

16. The method of claim 10 wherein the pacifier has a hollow nipple with a bulbous end and a reduced diameter sidewall behind the bulbous end, and the sidewall having an outlet for the milk droplets, whereby the milk is dispensed from the pacifier outlet rearward of the bulbous end into the side of the baby's mouth.

17. The method of claim 13 wherein a care provider controls the discharge of milk droplets from the pacifier into the baby's mouth.

18. The method of claim 10 wherein a caregiver controls the timing and amount of milk given orally to the premature baby.

19. The method of claim 10 wherein the first feeding tube and the second tube in the pacifier provide two separate paths for nurturing the baby.

* * * * *